US010462340B2

United States Patent
Mishra et al.

(10) Patent No.: US 10,462,340 B2
(45) Date of Patent: Oct. 29, 2019

(54) METHODS AND APPARATUS FOR WIRELESSLY CONTROLLING LIGHTING EFFECTS OF A NETWORKED LIGHT SOURCE

(71) Applicant: SIGNIFY HOLDING B.V., Eindhoven (NL)

(72) Inventors: Om Prakash Mishra, Bangalore (IN); Kapil Kumar Agarwal, Bangalore (IN)

(73) Assignee: SIGNIFY HOLDING B.V., Eindhoven (NL)

(*) Notice: Subject to any disclaimer, the term of this patent is extended or adjusted under 35 U.S.C. 154(b) by 30 days.

(21) Appl. No.: 15/119,900

(22) PCT Filed: Feb. 9, 2015

(86) PCT No.: PCT/IB2015/050950
§ 371 (c)(1),
(2) Date: Aug. 18, 2016

(87) PCT Pub. No.: WO2015/128760
PCT Pub. Date: Sep. 3, 2015

(65) Prior Publication Data
US 2017/0064169 A1   Mar. 2, 2017

Related U.S. Application Data

(60) Provisional application No. 62/000,565, filed on May 20, 2014.

(30) Foreign Application Priority Data

Feb. 25, 2014   (IN) .............................. 942/CHE/2014

(51) Int. Cl.
H04N 5/222        (2006.01)
H04N 5/225        (2006.01)
(Continued)

(52) U.S. Cl.
CPC ........... *H04N 5/2256* (2013.01); *G03B 15/05* (2013.01); *H04N 5/2354* (2013.01);
(Continued)

(58) Field of Classification Search
CPC ........... H04N 5/23203; H04N 5/23206; H04N 5/2256; H04N 5/2354; G03B 2215/05; G03B 7/16; G03B 15/02; G03B 15/04
See application file for complete search history.

(56) References Cited

U.S. PATENT DOCUMENTS 8,994,876 B2 * 3/2015 Spielberg ............. H04N 5/2354
348/370
2005/0001902 A1 * 1/2005 Brogan .............. H04N 1/00127
348/207.1

(Continued)

FOREIGN PATENT DOCUMENTS

CN    101516154 A    8/2009
CN    102014545 A    4/2011
(Continued)

OTHER PUBLICATIONS

Varanva, Devendra J., et al., "LED to LED Communication With WDM Concept for Flash Light of Mobile Phones, Visible Light Communication," International Journal of Advanced Computer Science and Applications, vol. 4, No. 7, 2013 (4 Pages).

*Primary Examiner* — Kelly L Jerabek
(74) *Attorney, Agent, or Firm* — Meenakshy Chakravorty (57) ABSTRACT

A method (460) for illuminating a target (20) with one or more lighting effects using a networked light source. An image recording device (16) comprising a wireless communications module (36) identifies any lighting units (10) located within a first distance (50) to the image recording device, and communicates, via the wireless communications module, a request to one or more of the identified lighting (Continued)

units to illuminate the target with one or more of a plurality of lighting effects when the image recording device captures an image or records a video.

17 Claims, 7 Drawing Sheets

(51) Int. Cl.
*H04N 5/235* (2006.01)
*H05B 33/08* (2006.01)
*H05B 37/02* (2006.01)
*G03B 15/05* (2006.01)
*H04N 5/232* (2006.01)

(52) U.S. Cl.
CPC ..... *H04N 5/23206* (2013.01); *H05B 33/0842* (2013.01); *H05B 37/0272* (2013.01); *G03B 2215/0557* (2013.01); *G03B 2215/0567* (2013.01)

(56) References Cited

U.S. PATENT DOCUMENTS

| | | |
|---|---|---|
| 2006/0038916 A1 | 2/2006 | Knoedgen et al. |
| 2009/0027511 A1 | 1/2009 | Kouno |
| 2010/0189429 A1 | 7/2010 | Butterworth |
| 2010/0202767 A1* | 8/2010 | Shirakawa ............. G03B 15/05 396/56 |
| 2012/0045193 A1* | 2/2012 | King ..................... G03B 15/05 396/56 |
| 2012/0229699 A1 | 9/2012 | Mate et al. |
| 2013/0050510 A1* | 2/2013 | Fujihashi ............... G03B 15/05 348/207.1 |
| 2013/0120636 A1* | 5/2013 | Baer .................... H04N 5/2354 348/335 |
| 2013/0195273 A1 | 8/2013 | Lord |
| 2013/0285574 A1 | 10/2013 | Garcia Morchon et al. |

FOREIGN PATENT DOCUMENTS

| | | |
|---|---|---|
| CN | 202472201 U | 10/2012 |
| CN | 103068110 A | 4/2013 |
| JP | 2012204953 A | 10/2012 |
| KR | 100970249 B1 | 7/2010 |

* cited by examiner

FIG. 7

METHODS AND APPARATUS FOR WIRELESSLY CONTROLLING LIGHTING EFFECTS OF A NETWORKED LIGHT SOURCE

CROSS-REFERENCE TO PRIOR APPLICATIONS

This application is the U.S. National Phase application under 35 U.S.C. § 371 of International Application No. PCT/IB2015/050950, filed on Feb. 9, 2015, which claims the benefit of U.S. Patent Application No. 62/000,565, filed on May 20, 2014 and Indian Patent Application No. 942/CHE/2014, filed on Feb. 25, 2014. These applications are hereby incorporated by reference herein.

TECHNICAL FIELD

The present invention is directed generally to illuminating a target with one or more lighting effects using a networked lighting unit. More particularly, various inventive methods and apparatus disclosed herein relate to illumination of a target using a camera or recording device that wirelessly coordinates with a networked lighting unit.

BACKGROUND

Networked lighting systems are becoming more advanced and integrated both in the retail and home setting, and are increasingly being used to enhance a user's environment and to improve safety, productivity, enjoyment, and relaxation. Recent advances in light-emitting diode (LED) technology have provided efficient full-spectrum lighting sources that enable a variety of lighting effects, including variations in color, intensity, and direction, for a wide variety of applications.

Some of these networked lighting systems feature one or more light sources, including one or more LEDs capable of producing different colors, as well as a controller for independently controlling the output of the LEDs in order to generate a wide variety of intensity, color, and color-changing lighting effects. The controller transmits commands to the one or more light sources over the wired or wireless communication medium of the lighting system to set or adjust, for example, the lighting effects. These commands can be addressed to one light source within the networked lighting system, or can be addressed to multiple light sources within the system.

It is often desirable to illuminate an environment or object to create sufficiently bright lighting effects, to accentuate or emphasize with directional lighting effects, or to create a pleasing presentation with colored lighting effects. For example, many still-photography cameras utilize flash units, a light source that outputs a controlled pulse of light in response to a signal from a controller. Similarly, many video cameras utilize a bright light source to illuminate an object, person, or scene being recorded. The flash unit or bright light source is typically mechanically attached to the camera or recording device for illumination of the object, person, or scene being photographed. Optionally, the flash unit or bright light source can be positioned some distance away from the camera in addition to, or instead of, a flash unit mechanically attached to a camera.

The flash unit or video camera light source receives a signal from a controller to initiate and terminate light output. However, these flash units or light sources are limited in their range of lighting effects, making it difficult to create dynamic light effects in a coordinated fashion. Additionally, the camera or recording device may be limited by both the size and number of flash units or light sources that are available, which can be insufficient in a large or dark space. Accordingly, there is a need in the art for methods of illuminating a target with a variety of lighting effects using a camera or recording device that wirelessly coordinates with a networked light source.

SUMMARY

The present disclosure is directed to inventive methods and apparatus for illuminating a target with one or more of a variety of lighting effects using a camera or recording device that wirelessly coordinates with a networked lighting unit having one or more LED-based light sources. In view of the foregoing, various embodiments and implementations are directed to a system in which a camera or other recording device identifies and wirelessly communicates with one or more networked lighting units located within a certain proximity of the device and directs the identified lighting units to emit light possessing one or more lighting effects. The lighting effect can be intensity, such as a high-intensity flash or sustained light, light of a certain color, or directional light, among other lighting effects. The lighting effect can be programmed or determined by a user of the camera or recording device, or can be determined automatically by a sensor associated with either the device or the ambient lighting unit.

For example, in some embodiments, the camera or other recording device is a smartphone or other portable computing device and includes a computer program, such as an application, that is configured or programmed to identify, characterize, and communicate with one or more networked lighting units to direct the unit's LED-based light sources to emit light having one or more lighting effects. The identified light sources will be those located within a certain proximity to the image capturing device such that the photographed or recorded target can be affected by the programmed lighting effect. When the portable computing device is ready to capture or record an image, the device communicates and coordinates with the identified networked light sources to direct the light sources to emit light having one or more programmed lighting effects.

For example, in some embodiments, when a user captures an image using the recording device, which can be for example a camera, video camera, smart phone, or a portable computing device, the recording device communicates with the networked lighting unit and directs the LED-based light sources of that lighting unit to function as the flash unit for the recording device, or to enhance the recording device's attached flash unit. In other embodiments, the LED-based light sources act as a sustained light source, for example when recording a video.

Generally, in one aspect, the invention relates to a method for illuminating a target, the method including the steps of identifying, using an image recording device including a wireless communications module, any lighting units located within a first distance to the image recording device, wherein each lighting unit comprises an LED-based light source capable of emitting light with one or more of a plurality of lighting effects; and communicating, via the wireless communications module, to one or more of the identified lighting units a request to illuminate the target with one or more of the plurality of lighting effects when the image recording device captures an image or records a video.

According to an embodiment, each lighting unit further includes a wireless communications module.

In various embodiments, the lighting units are connected via the wireless communications module to a network, and the communicating step includes communication via the network, such as, for example, the Internet, and/or a local network.

According to an embodiment, the first distance is any distance within which the target will be affected by one or more of the plurality of lighting effects.

According to an embodiment, the image recording device further includes a sensor configured to determine a parameter of ambient light.

The request to illuminate the target with one or more of the plurality of lighting effects may be based at least in part on the determined parameter.

According to an embodiment, the image recording device further includes a user interface configured to obtain data from a user regarding one or more of the plurality of lighting effects.

According to an embodiment, the method further includes the step of obtaining, via the user interface, data from the user regarding the request to illuminate the target with one or more of the plurality of lighting effects when the image recording device captures an image or records a video.

Generally, in one aspect, the invention relates to an image recording device configured to capture an image or record a video of a target, the image recording device including a wireless communications module a processor, and a non-transitory computer readable storage medium including a set of instructions that are executable by the processor, the set of instructions being operable at least to: identify, using the wireless communications module, any lighting units located within a first distance from the image recording device, wherein the lighting unit comprises an LED-based light source capable of emitting light with one or more of a plurality of lighting effects, and direct the wireless communications module to communicate to one or more of the identified lighting units a request to illuminate the target with one or more of the plurality of lighting effects when the image recording device captures an image or records a video.

According to an embodiment, each lighting unit further includes a wireless communications module.

According to an embodiment, the image recording device further comprises a sensor configured to determine a parameter of ambient light.

According to an embodiment, the request to illuminate the target with one or more of the plurality of lighting effects is based at least in part on the determined parameter.

According to an embodiment, the device further comprises a user interface configured to obtain data from a user regarding one or more of the plurality of lighting effects.

According to an embodiment, the request to illuminate the target with one or more of the plurality of lighting effects is based at least in part on the obtained data.

According to an embodiment, the image recording device is a camera, video camera, smart phone, and/or portable computing device.

Generally, in one aspect, the invention relates to a lighting system configured to illuminate a target, the lighting system including a lighting unit having an LED-based light source capable of emitting light with one or more of a plurality of lighting effects, a communications module, and a controller operably connected between the communications module and the LED-based light source, where the lighting unit is connected via the wireless communications module to a network, and the lighting system further including an image recording device including a wireless communications module, where the image recording device is programmed to wirelessly transmit to the lighting unit communications module a request to illuminate the target with one or more of the plurality of lighting effects when the image recording device records an image, wherein the controller is configured to direct the LED-based light source to emit the one or more lighting effects in response to the request.

According to an embodiment, the request to illuminate the target is transmitted, at least part, via the network, such as, for example, the Internet, and/or a local network.

In various embodiments, the lighting unit is individually addressable.

According to an embodiment, the image recording device further includes a sensor configured to determine a parameter of ambient light.

According to an embodiment, the request to illuminate the target with one or more of the plurality of lighting effects is based at least in part on the determined parameter.

According to an embodiment, the request to illuminate the target with one or more of the plurality of lighting effects is based at least in part on data obtained from a user of the image recording device.

As used herein for purposes of the present disclosure, the term "LED" should be understood to include any electroluminescent diode or other type of carrier injection/junction-based system that is capable of generating radiation in response to an electric signal. Thus, the term LED includes, but is not limited to, various semiconductor-based structures that emit light in response to current, light emitting polymers, organic light emitting diodes (OLEDs), electroluminescent strips, and the like. In particular, the term LED refers to light emitting diodes of all types (including semi-conductor and organic light emitting diodes) that may be configured to generate radiation in one or more of the infrared spectrum, ultraviolet spectrum, and various portions of the visible spectrum (generally including radiation wavelengths from approximately 400 nanometers to approximately 700 nanometers).

For example, one implementation of an LED configured to generate essentially white light (e.g., a white LED) may include a number of dies which respectively emit different spectra of electroluminescence that, in combination, mix to form essentially white light. In another implementation, a white light LED may be associated with a phosphor material that converts electroluminescence having a first spectrum to a different second spectrum. In one example of this implementation, electroluminescence having a relatively short wavelength and narrow bandwidth spectrum "pumps" the phosphor material, which in turn radiates longer wavelength radiation having a somewhat broader spectrum.

The term "light source" should be understood to refer to any one or more of a variety of radiation sources, including, but not limited to, LED-based sources (including one or more LEDs as defined above).

A given light source may be configured to generate electromagnetic radiation within the visible spectrum, outside the visible spectrum, or a combination of both. Hence, the terms "light" and "radiation" are used interchangeably herein. Additionally, a light source may include as an integral component one or more filters (e.g., color filters), lenses, or other optical components. Also, it should be understood that light sources may be configured for a variety of applications, including, but not limited to, indication, display, and/or illumination. An "illumination source" is a light source that is particularly configured to generate radiation having a sufficient intensity to effectively illuminate an interior or exterior space. In this context, "sufficient intensity" refers to sufficient radiant power in the visible spectrum generated in the space or environment (the unit "lumens" often is employed to represent the total light output from a light source in all directions, in terms of radiant power or "luminous flux") to provide ambient illumination (i.e., light that may be perceived indirectly and that may be, for example, reflected off of one or more of a variety of intervening surfaces before being perceived in whole or in part).

The term "spectrum" should be understood to refer to any one or more frequencies (or wavelengths) of radiation produced by one or more light sources. Accordingly, the term "spectrum" refers to frequencies (or wavelengths) not only in the visible range, but also frequencies (or wavelengths) in the infrared, ultraviolet, and other areas of the overall electromagnetic spectrum. Also, a given spectrum may have a relatively narrow bandwidth (e.g., a FWHM having essentially few frequency or wavelength components) or a relatively wide bandwidth (several frequency or wavelength components having various relative strengths). It should also be appreciated that a given spectrum may be the result of a mixing of two or more other spectra (e.g., mixing radiation respectively emitted from multiple light sources).

For purposes of this disclosure, the term "color" is used interchangeably with the term "spectrum." However, the term "color" generally is used to refer primarily to a property of radiation that is perceivable by an observer (although this usage is not intended to limit the scope of this term). Accordingly, the terms "different colors" implicitly refer to multiple spectra having different wavelength components and/or bandwidths. It also should be appreciated that the term "color" may be used in connection with both white and non-white light.

The term "color temperature" generally is used herein in connection with white light, although this usage is not intended to limit the scope of this term. Color temperature essentially refers to a particular color content or shade (e.g., reddish, bluish) of white light. The color temperature of a given radiation sample conventionally is characterized according to the temperature in degrees Kelvin (K) of a black body radiator that radiates essentially the same spectrum as the radiation sample in question. Black body radiator color temperatures generally fall within a range of from approximately 700 degrees K (typically considered the first visible to the human eye) to over 10,000 degrees K; white light generally is perceived at color temperatures above 1500-2000 degrees K.

Lower color temperatures generally indicate white light having a more significant red component or a "warmer feel," while higher color temperatures generally indicate white light having a more significant blue component or a "cooler feel." By way of example, fire has a color temperature of approximately 1,800 degrees K, a conventional incandescent bulb has a color temperature of approximately 2848 degrees K, early morning daylight has a color temperature of approximately 3,000 degrees K, and overcast midday skies have a color temperature of approximately 10,000 degrees K. A color image viewed under white light having a color temperature of approximately 3,000 degree K has a relatively reddish tone, whereas the same color image viewed under white light having a color temperature of approximately 10,000 degrees K has a relatively bluish tone.

The term "lighting fixture" is used herein to refer to an implementation or arrangement of one or more lighting units in a particular form factor, assembly, or package. The term "lighting unit" is used herein to refer to an apparatus including one or more light sources of same or different types. A given lighting unit may have any one of a variety of mounting arrangements for the light source(s), enclosure/housing arrangements and shapes, and/or electrical and mechanical connection configurations. Additionally, a given lighting unit optionally may be associated with (e.g., include, be coupled to and/or packaged together with) various other components (e.g., control circuitry) relating to the operation of the light source(s). An "LED-based lighting unit" refers to a lighting unit that includes one or more LED-based light sources as discussed above, alone or in combination with other non LED-based light sources. A "multi-channel" lighting unit refers to an LED-based or non LED-based lighting unit that includes at least two light sources configured to respectively generate different spectrums of radiation, wherein each different source spectrum may be referred to as a "channel" of the multi-channel lighting unit.

The term "controller" is used herein generally to describe various apparatus relating to the operation of one or more light sources. A controller can be implemented in numerous ways (e.g., such as with dedicated hardware) to perform various functions discussed herein. A "processor" is one example of a controller which employs one or more microprocessors that may be programmed using software (e.g., microcode) to perform various functions discussed herein. A controller may be implemented with or without employing a processor, and also may be implemented as a combination of dedicated hardware to perform some functions and a processor (e.g., one or more programmed microprocessors and associated circuitry) to perform other functions. Examples of controller components that may be employed in various embodiments of the present disclosure include, but are not limited to, conventional microprocessors, application specific integrated circuits (ASICs), and field-programmable gate arrays (FPGAs).

In various implementations, a processor or controller may be associated with one or more storage media (generically referred to herein as "memory," e.g., volatile and non-volatile computer memory such as RAM, PROM, EPROM, and EEPROM, floppy disks, compact disks, optical disks, magnetic tape, etc.). In some implementations, the storage media may be encoded with one or more programs that, when executed on one or more processors and/or controllers, perform at least some of the functions discussed herein. Various storage media may be fixed within a processor or controller or may be transportable, such that the one or more programs stored thereon can be loaded into a processor or controller so as to implement various aspects of the present invention discussed herein. The terms "program" or "computer program" are used herein in a generic sense to refer to any type of computer code (e.g., software or microcode) that can be employed to program one or more processors or controllers.

The term "addressable" is used herein to refer to a device (e.g., a light source in general, a lighting unit or fixture, a controller or processor associated with one or more light sources or lighting units, other non-lighting related devices, etc.) that is configured to receive information (e.g., data) intended for multiple devices, including itself, and to selectively respond to particular information intended for it. The term "addressable" often is used in connection with a networked environment (or a "network," discussed further below), in which multiple devices are coupled together via some communications medium or media.

In one network implementation, one or more devices coupled to a network may serve as a controller for one or more other devices coupled to the network (e.g., in a master/slave relationship). In another implementation, a networked environment may include one or more dedicated controllers that are configured to control one or more of the devices coupled to the network. Generally, multiple devices coupled to the network each may have access to data that is present on the communications medium or media; however, a given device may be "addressable" in that it is configured to selectively exchange data with (i.e., receive data from and/or transmit data to) the network, based, for example, on one or more particular identifiers (e.g., "addresses") assigned to it.

The term "network" as used herein refers to any interconnection of two or more devices (including controllers or processors) that facilitates the transport of information (e.g. for device control, data storage, data exchange, etc.) between any two or more devices and/or among multiple devices coupled to the network. As should be readily appreciated, various implementations of networks suitable for interconnecting multiple devices may include any of a variety of network topologies and employ any of a variety of communication protocols. Additionally, in various networks according to the present disclosure, any one connection between two devices may represent a dedicated connection between the two systems, or alternatively a non-dedicated connection. In addition to carrying information intended for the two devices, such a non-dedicated connection may carry information not necessarily intended for either of the two devices (e.g., an open network connection). Furthermore, it should be readily appreciated that various networks of devices as discussed herein may employ one or more wireless, wire/cable, and/or fiber optic links to facilitate information transport throughout the network.

The term "user interface" as used herein refers to an interface between a human user or operator and one or more devices that enables communication between the user and the device(s). Examples of user interfaces that may be employed in various implementations of the present disclosure include, but are not limited to, switches, potentiometers, buttons, dials, sliders, a mouse, keyboard, keypad, various types of game controllers (e.g., joysticks), track balls, display screens, various types of graphical user interfaces (GUIs), touch screens, microphones and other types of sensors that may receive some form of human-generated stimulus and generate a signal in response thereto.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

DETAILED DESCRIPTION

It is often desirable to illuminate an environment or object to create sufficiently bright lighting effects, to accentuate or emphasize with directional lighting effects, or to create a pleasing presentation with colored lighting effects, especially when performing videography or still-photography. For example, many still-photography cameras utilize flash units, a light source that outputs a controlled pulse of light in response to a signal from a controller, timed to emit a lighting effect in conjunction with image capture. Similarly, many video cameras utilize a bright light source to illuminate an object, person, or scene being recorded. However, these flash units and light sources are limited in their size, number, and range of lighting effects, making it difficult to create dynamic light effects in a coordinated fashion.

More generally, Applicants have recognized and appreciated that it would be beneficial to illuminate a target with one or more of a variety of lighting effects using a programmable camera or recording device that wirelessly coordinates with a networked lighting fixture having one or more LED-based light sources.

In view of the foregoing, various embodiments and implementations are directed to a system in which a camera or other recording device identifies and wirelessly communicates with one or more networked lighting units located within a certain proximity of the device and directs the identified lighting units to emit light having one or more lighting effects. The lighting effect can be intensity, such as a high-intensity flash or sustained light, light of a certain color, or directional light, among other lighting effects.

Figure 1:
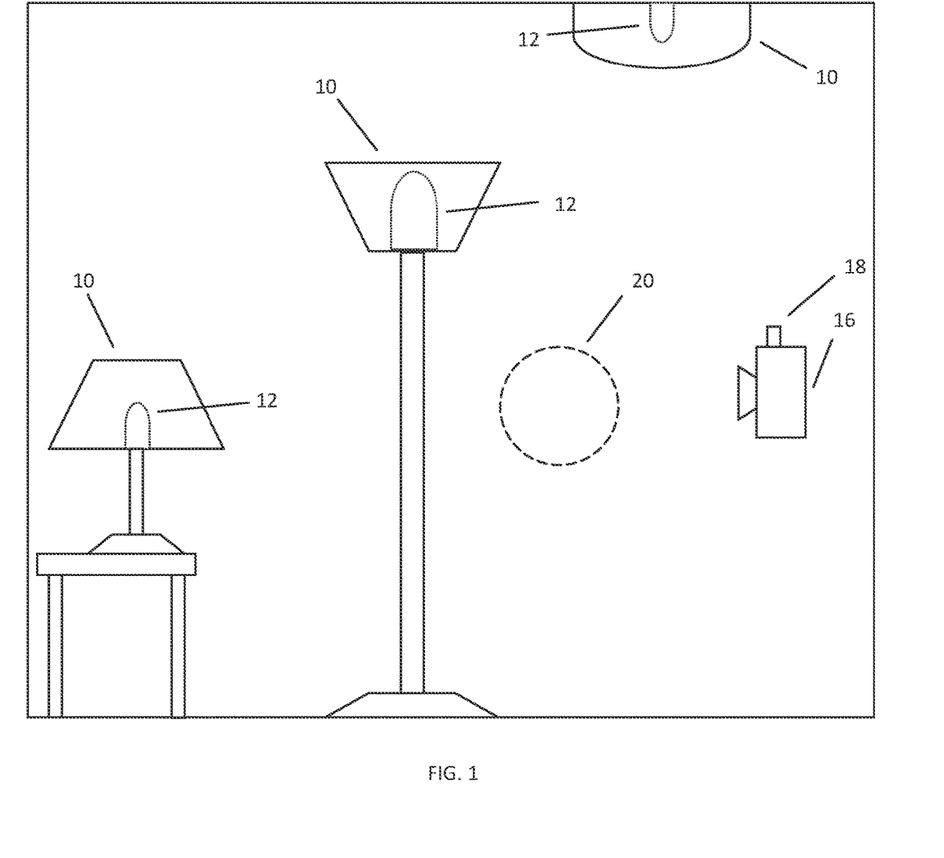
FIG. 1 is a schematic representation of an image capturing device and system in accordance with an embodiment of the invention.

Referring to FIG. 1, in one embodiment, a lighting unit 10 is provided that includes one or more light sources 12, where one or more of the light sources may be an LED-based light source. Further, the LED-based light source may have one or more LEDs. The light source can be driven to emit light of predetermined character (i.e., color intensity, color temperature) by one or more light source drivers 14 (shown in FIG. 2). Many different numbers and various types of light sources (all LED-based light sources, LED-based and non-LED-based light sources alone or in combination, etc.) adapted to generate radiation of a variety of different colors may be employed in the lighting unit 10. As shown in FIG. 1, lighting unit 10 can be any type of lighting fixture, including but not limited to a floor lamp, a table lamp, a spot light, ceiling light, and many other types of lighting fixtures.

Also in FIG. 1 is an image recording device 16, which can be a camera, video camera, or any other device configured or capable of capturing an image, including by still photography and videography, among others. While image recording device 16 can be a device dedicated solely or primarily to capturing images, such as a camera or video camera, image recording device 16 can also be any device with the capability of capturing an image, such as a smart phone, wearable computer peripheral, or other device.

According to an embodiment, image recording device 16 includes its own flash unit or light source 18 that outputs a controlled pulse of light, or a sustained bright light, in response to a signal from a controller. The image recording device can be utilized, for example, to capture an image or recording of a target 20, which can be any object, person, scene, or other thing or environment capable of being recorded. Image recording device 16 may also include a user interface 37 with which a user may control the image recording device, provide data, or otherwise analyze, understand, and/or manipulate one or more steps of the process and methods described herein.

Figure 2:
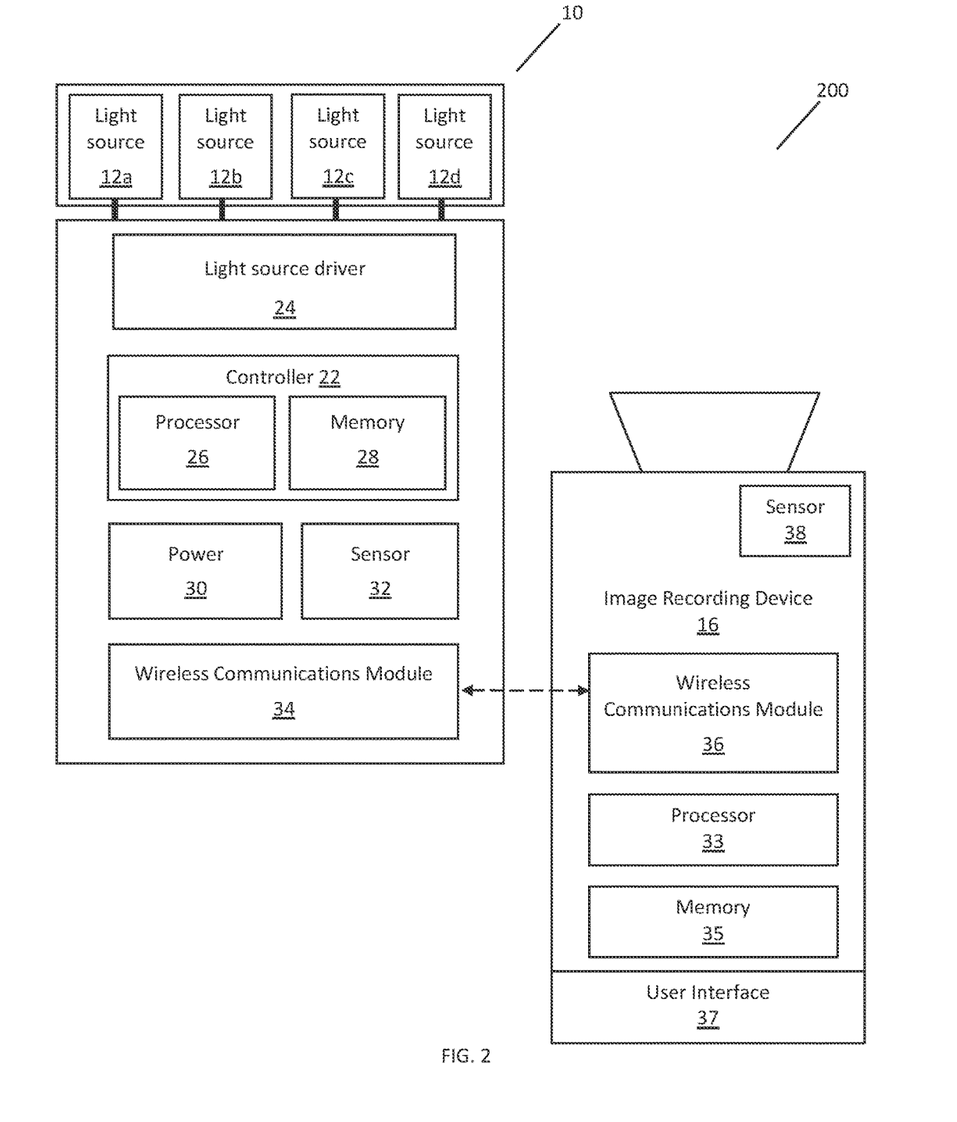
FIG. 2 is a schematic representation of an image capturing device and lighting unit in accordance with an embodiment of the invention.

Referring now to FIG. 2, lighting unit 10 may include a controller 22 that is configured or programmed to output one or more signals to drive the one or more light sources 12a-d and generate varying intensities and/or colors of light from the light sources. For example, controller 22 may be programmed or configured to generate a control signal for each light source to independently control the intensity and/or color of light generated by each light source, to control groups of light sources, or to control all light sources together. According to another aspect, the controller 22 may control other dedicated circuitry such as light source driver 24 which in turn controls the light sources so as to vary their intensities. Controller 22 can be or have, for example, a processor 26 programmed using software to perform various functions discussed herein, and can be utilized in combination with a memory 28. Memory 28 can store data, including one or more lighting commands or software programs for execution by processor 26, as well as various types of data including but not limited to specific identifiers for that lighting unit. For example, the memory 28 may be a non-transitory computer readable storage medium that includes a set of instructions that are executable by processor 26, and which cause the system to execute one or more of the steps of the methods described herein.

Controller 22 can be programmed, structured and/or configured to cause light source driver 24 to regulate the intensity and/or color temperature of light source 12 based on predetermined data, such as ambient light conditions and the time of day, among others, as will be explained in greater detail hereinafter. Controller 22 can also be programmed, structured and/or configured to cause light source driver 24 to regulate the intensity and/or color temperature of light source 12 based on communications received by a wireless communications module 34.

Lighting unit 10 also includes a source of power 30, most typically AC power, although other power sources are possible including DC power sources, solar-based power sources, or mechanical-based power sources, among others. The power source may be in operable communication with a power source converter that converts power received from an external power source to a form that is usable by the lighting unit. In order to provide power to the various components of lighting unit 10, it can also includes an AC/DC converter (e.g., rectifying circuit) that receives AC power from an external AC power source 30 and converts it into direct current for purposes of powering the light unit's components. Additionally, lighting unit 10 can include an energy storage device, such as a rechargeable battery or capacitor, that is recharged via a connection to the AC/DC converter and can provide power to controller 22 and light source driver 24 when the circuit to AC power source 30 is opened.

In addition, lighting unit 10 can include a light sensor 32, such as a photodiode, that is connected to an input of controller 22 and collects ambient light data in the vicinity of lighting unit 10 and can transmit data to controller 22, or externally via wireless communications module 34, that is representative of the ambient light data it collects. In some embodiments, sensor 32 is remote from the lighting unit 10 and transmits obtained sensor data to wireless communications module 34 of the lighting unit. The wireless communications module 34 can be, for example, Wi-Fi, Bluetooth, IR, radio, or near field communication that is positioned in communication with controller 22 or, alternatively, controller 22 can be integrated with the wireless communications module.

Image recording device 16 can include a wireless communications module 36 that can be any communications device or protocol including but not limited to Wi-Fi, Bluetooth, IR, or a near field communication (NFC) chip. Image recording device 16 can include a sensor 38, such as a photodiode, that is collects ambient light data in the vicinity of image recording device 16 and can transmit data internally, or externally via wireless communications module 36, that is representative of the ambient light data it collects.

Lighting unit 10 may also include a processor 33 programmed using software to perform various functions discussed herein, and can be utilized in combination with a memory 35. Memory 35 can store data, including one or more lighting commands or software programs for execution by processor 33, as well as various types of data. For example, the memory 35 may be a non-transitory computer readable storage medium that includes a set of instructions that are executable by processor 33, and which cause the system to execute one or more of the steps of the methods described herein.

Figure 4:
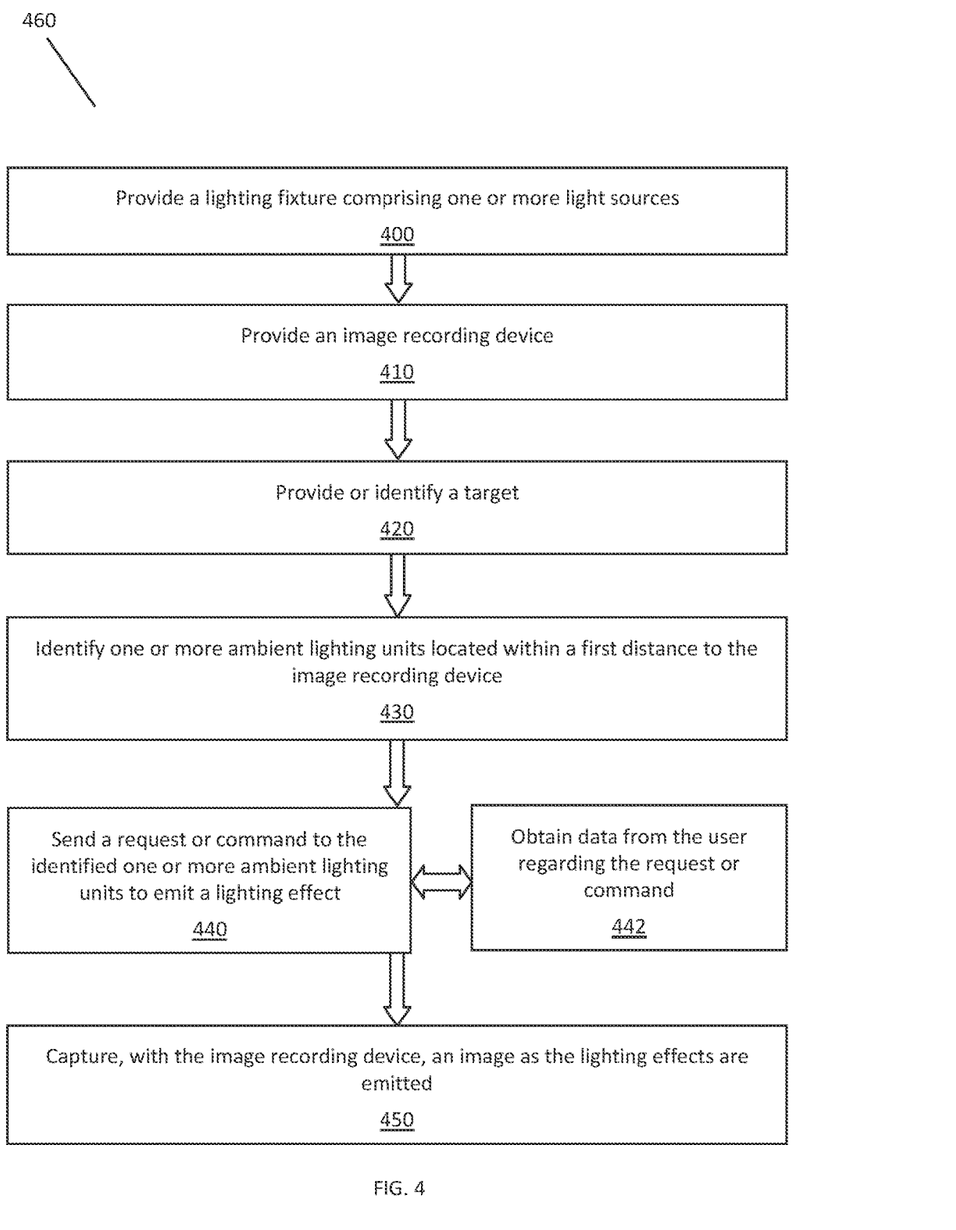
FIG. 4 is a flow chart of a method for illuminating a target with one or more lighting effects using a networked light source in accordance with an embodiment of the invention.

Referring to FIG. 4, a flow chart illustrating a method 460 for determining a lighting profile in accordance with an embodiment of the invention is disclosed. In step 400, a lighting unit 10 is provided. Lighting unit 10 can be any of the embodiments described herein or otherwise envisioned, and can include any of the components of the lighting units described in conjunction with FIGS. 1 and 2 (e.g., one or more LED-based light sources 12, light source driver 24, controller 22, sensor 32, wireless communications module 34, etc.).

In step 410, an image recording device 16 is provided. Image recording device 16 can be a camera, video camera, or any other device configured or capable of capturing an image, including by still photography and videography, among others. Generally, image recording device 16 can be any of the embodiments described herein or otherwise envisioned, and can include any of the components of the devices described in conjunction with FIGS. 1 and 2 (e.g., one or more LED-based light sources 12, sensor 38, wireless communications module 36, etc.).

In step 420, a target 20 is provided or otherwise identified. Target 20 can be, for example, any object, person, scene, or other thing or environment capable of being recorded. As just one example, target 20 may be a person or group of people. Target 20 may be a still target, or can move around the environment.

Figure 5:
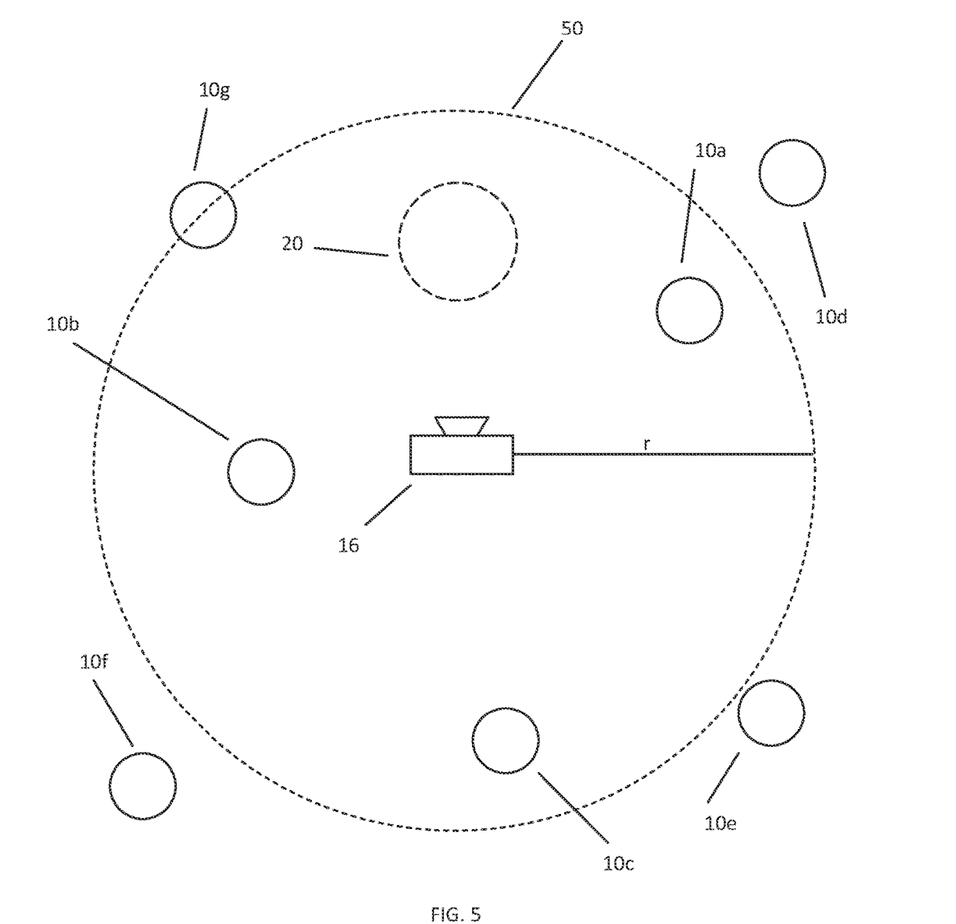
FIG. 5 is a schematic representation of an image capturing system in accordance with an embodiment of the invention.
Figure 6:
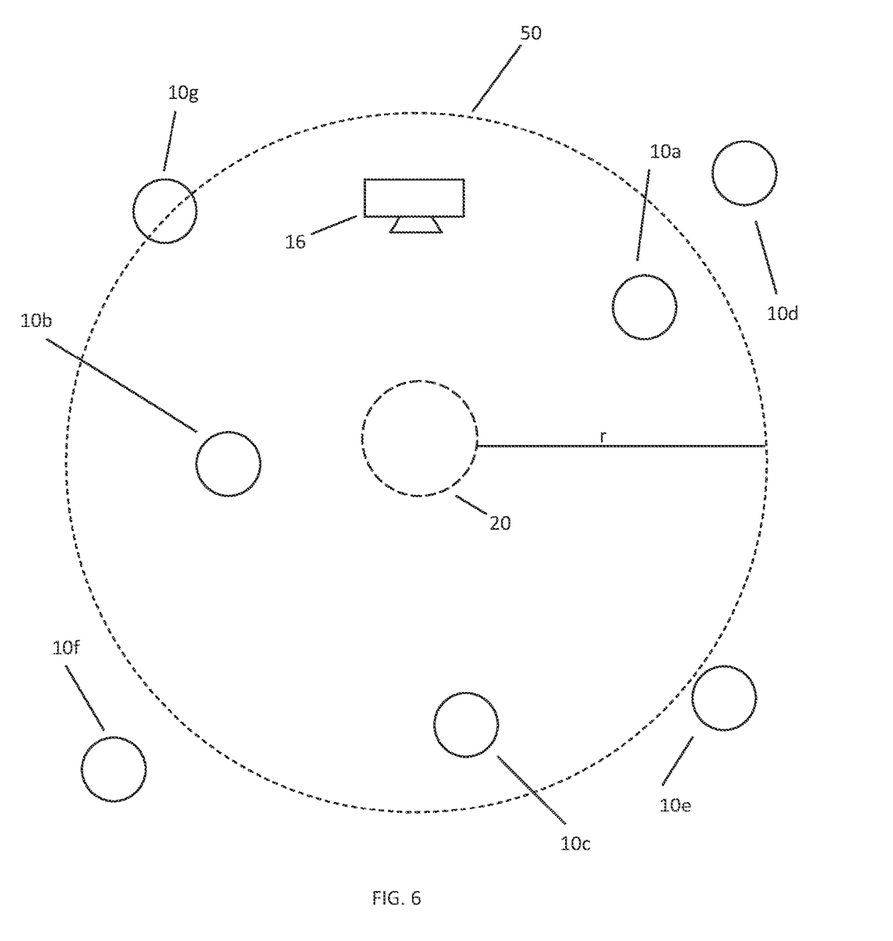
FIG. 6 is a schematic representation of an image capturing system in accordance with one embodiment of the invention.
Figure 7:
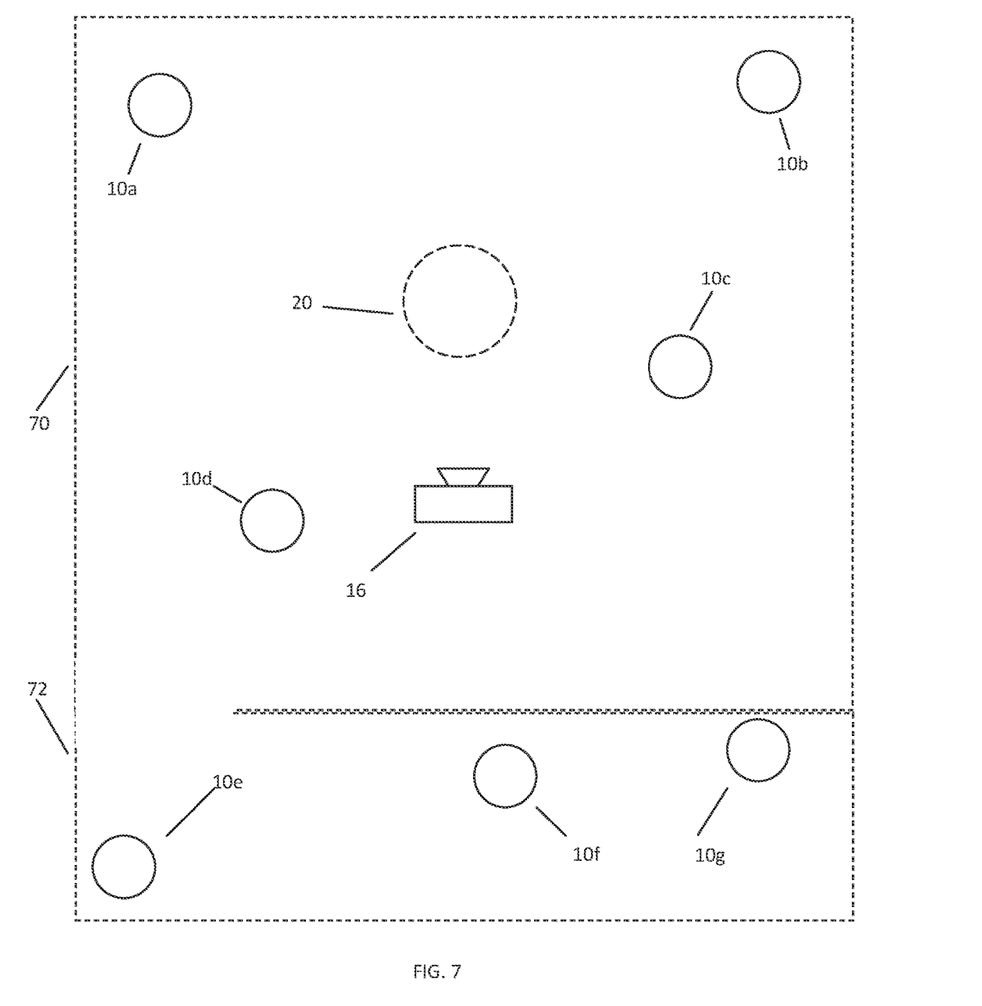
FIG. 7 is a schematic representation of an image capturing system in accordance with another embodiment of the invention.

In step 430, the image recording device or another component of the image capturing system identifies one or more ambient lighting units 10 located within a first distance 50 to the image recording device. According to an embodiment, first distance 50 is any predetermined, user selected, or responsive distance. For example, as shown in FIG. 5, first distance 50 is a circle with radius r extending outwardly from the image capturing device 16. In FIG. 6, first distance 50 is a circle with radius r extending outwardly from the target 20. Radius r, for example, can be any desirable distance, but is preferably a distance in which the lighting effects from lighting units 10 located within that radius can have an effect on the target 20. In addition to substantially circular, first distance 50 can be any shape or size in both two-dimensional and/or three-dimensional space. For example, it can include, exclude, or be limited to lighting units located above target 20, next to target 20, below target 20, immediately near target 20, and/or some distance away from target 20. In FIG. 7, for example, first distance 50 is defined in part or in whole by one or more natural boundaries existing in the environment. For example, image recording device 16 or the image recording system identifies and/or selects each lighting unit 10 located within room 70, but excludes from identification and/or selection the lighting units 10 located in adjoining room 72.

According to an embodiment, first distance 50 is a predetermined or preprogrammed distance. It can be a predetermined or programmed distance from the lighting unit 10, the image capturing device 16, or target 20, for example. The predetermined or programmed distance can be determined or programmed during manufacture or the lighting unit 10 or the image capturing device 16, for example. As just one example, the predetermined or programmed distance can be set to a certain distance, such as approximately 20 feet, from the lighting unit 10, the image capturing device 16, or the target 20. This distance can be much closer or much more distant depending on a variety of factors including one or more characteristics of lighting unit 10 or image capturing device 16, the environment in which lighting unit 10 or image capturing device 16 will be or could be utilized, one or more characteristics of target 20, and/or a wide variety of other factors. Selection based on a predetermined or programmed distance can be automatic without user intervention, or can be based on subsequent user intervention.

According to an embodiment, first distance 50 is determined by and/or based on user input. For example, image capturing device 16 may include a user input via which a user sets, chooses, limits, or otherwise defines or characterizes one or more parameters of first distance 50. For example, the user may define a radius, perimeter, shape, or other definition. Selection may be as simple as a pull-down menu, a button, scroll, or other simple selection mechanism, or may be based on an algorithm, calculation, or other selection method using the user interface 37. As just one example, a user may select, estimate, or guess a radius based on the size of the room in which the user and/or the image capturing device 16 are located, and enter that radius as the user input upon which first distance 50 is determined and/or based. As another example, the user may simply select a preprogrammed button or other selection, such as "current room," "within 10 feet," "any nearby light(s)," "only ceiling light(s)," among many other selections and definitions. As yet another example, the user may select one or more lighting units 10 that have been identified by the image capturing device 16 or system as being within a certain range, distance, or location from or in relation to image capturing device 16. The identified lighting units can be presented to the user as a map, a list, or other display technique and the user can select none, one, some, or all of the identified lighting units 10. In addition to the above, there are many other ways to determine or define first distance 50 via user input. Furthermore, there are many other ways to identify and/or select lighting units 10 in addition to the above.

According to an embodiment, first distance 50 is determined by and/or based on sensor data. For example, image capturing device 16 may include a sensor 38 via which the image capturing device 16 and/or the system sets, chooses, limits, or otherwise defines or characterizes one or more parameters of first distance 50. For example, the sensor may be a photodiode or other sensor that measures or characterizes a quality of ambient light in the environment surrounding the image capturing device 16 and/or the target 20. If the ambient light is sufficient, the first distance 50 may be zero or very small, or the lighting units 10 identified within a first distance may be filtered or otherwise limited for subsequent use in the method. If the ambient light is insufficient, the first distance 50 may be large small, or the lighting units 10 identified within a first distance may be otherwise modified for subsequent use in the method. As just one example, image capturing device 16 may be a smart phone or camera with an ambient light sensor. As another example, one or more of lighting units 10 identified within a first distance may have a sensor 32 such as photodiode or other sensor that measures or characterizes a quality of ambient light in the environment surrounding the identified lighting unit 10, the image capturing device 16, and/or the target 20. There are many ways in which the sensor information may be used to define, limit, expand, or otherwise characterize and/or modify first distance 50 and the lighting units identified within first distance 50.

Figure 3:
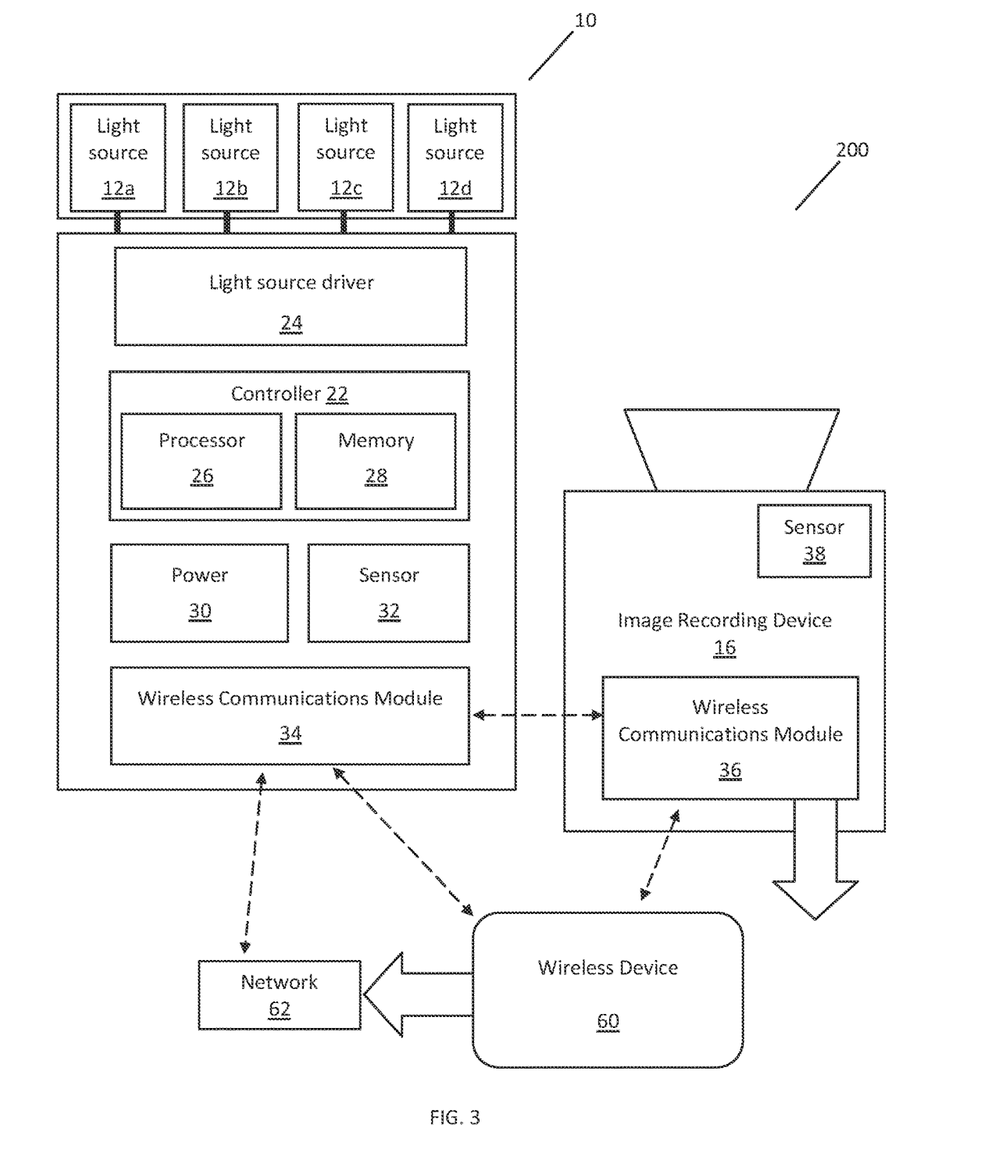
FIG. 3 is a schematic representation of an image capturing device and lighting unit in accordance with an embodiment of the invention.

As an example of a step of identifying one or more ambient lighting units 10 located within a first distance 50 to the image recording device, image recording device 16 in FIG. 5 broadcasts a signal using wireless communications module 36. Lighting units 10a-g receive the broadcast signal, analyze the signal, and broadcast a signal back to the image recording device using wireless communications module 34. The analysis by the lighting units may involve a security protocol, or some other method of verifying or authenticating the signal from the image recording device. For example, lighting unit 10 may communicate locally or externally via a wired or wireless device 60 and/or network 62 to a database to request authorization, as shown in FIG. 3. As another example, lighting unit 10 may be programmed to authorize signals from certain devices, individuals, or locations, or at certain times or dates, among other things. As yet another example, lighting unit 10 may require a password or PIN code from the image recording device or the user in order to respond or activate in response to the signal from the image recording device.

Image recording device 16 then receives the signal broadcast from the one or more lighting units within broadcast range, and can then analyze and/or present that information to the user. For example, image recording device 16 may determine the approximate location of each of the one or more lighting units 10 in relation to itself and/or the target 20 based on signal latency time, GPS, identification codes, or any other measurement system. Which of the one or more lighting units 10 that are utilized in other steps of the method can be determined based on one or more of the methods or mechanisms described elsewhere herein.

According to an embodiment, image recording device 16 may include a software program or application that allows the device and/or the user to complete one or more steps of the method. For example, software program or application may include a user interface through which the user performs or directs one or more steps of the method. As another example, the software program or application may be automated such that the steps of the method are performed automatically when the user snaps a photo or records a video.

Referring to FIG. 5, image recording device 16 broadcasts a signal that is received by each of lighting units 10a through 10g. Each of lighting units 10a through 10g respond, optionally after authenticating or otherwise analyzing the signal, by sending a wireless signal to image recording device 16. According to an embodiment, the communication between image recording device 16 and one or more of lighting units 10a through 10g is performed, at least in part, via a wired or wireless device 60 and/or network 62, or, alternatively, via network 62 that is accessed by wireless device 60 which in turn communicates with image recording device 16 and/or one or more of lighting units 10a through 10g. Image recording device 16 analyzes the received data and creates, retrieves, or otherwise determines an approximate map of the location of one or more of lighting units 10a through 10g. Using first distance 50 and/or user input, image recording device 16 then selects which of lighting units 10a through 10g will be utilized in other steps of the method. For example, lighting units 10a, 10b, and 10c are located within first distance 50, and will be utilized in other steps of the method. Lighting units 10d, 10e, and 10f are not located within first distance 50, and will not be utilized in other steps of the method. Lighting unit 10g is located on the boundary of first distance 50, and may or may not be used based on user input, a preprogrammed algorithm, or sensor data, for example.

Similarly in FIG. 6, image recording device 16 broadcasts a signal that is received by each of lighting units 10a through 10g. Each of lighting units 10a through 10g respond, optionally after authenticating or otherwise analyzing the signal, by sending a wireless signal to image recording device 16. Image recording device 16 analyzes the received data and creates, retrieves, or otherwise determines an approximate map of the location of one or more of lighting units 10a through 10g. In this example, the system defines first distance 50 around target 20. Information about target 20 can be obtained via user input into the system, or by a sensor, among other ways of characterizing the target. Using first distance 50 and/or user input, image recording device 16 then selects which of lighting units 10a through 10g will be utilized in other steps of the method. For example, lighting units 10a, 10b, and 10c are located within first distance 50 from target 20, and will be utilized in other steps of the method. Lighting units 10d, 10e, and 10f are not located within first distance 50 from target 20, and will not be utilized in other steps of the method. Lighting unit 10g is located on the boundary of first distance 50 from target 20, and may or may not be used based on user input, a preprogrammed algorithm, or sensor data, for example.

Referring to FIG. 7, image recording device 16 broadcasts a signal that is received by each of lighting units 10a through 10g. Each of lighting units 10a through 10g respond, optionally after authenticating or otherwise analyzing the signal, by sending a wireless signal to image recording device 16. Image recording device 16 analyzes the received data and creates, retrieves, or otherwise determines an approximate map of the location of one or more of lighting units 10a through 10g. In this example, the system defines first distance 50 around the schematics of the environment, including rooms 70 and 72. The schematic information may be programmed, predetermined, based on user data, and/or based on sensor data, among other sources of information. Image recording device 16 then selects which of lighting units 10a through 10g will be utilized in other steps of the method, based on the location of each lighting unit within the environment. For example, lighting units 10a, 10b, 10c, and 10d are located within room 70, and (i.e., are located within first distance 5), and will be utilized in other steps of the method. Lighting units 10e, 10f, and 10g are not located in room 70, they are instead in adjacent room 72, and will not be utilized in other steps of the method.

At step 440 of the method, image recording device 16 communicates to the identified lighting units 10, via wireless communications module 36, a command or request to emit or produce one or more of a plurality of lighting effects, thereby illuminating or otherwise affecting the target when the image recording device captures an image or records a video. For example, the one or more lighting effects can be intensity, such as a high-intensity flash or sustained light, light of a certain color, or directional light, among a multitude of other lighting effects.

As an example, the command or request communicated to the identified lighting units 10 from image recording device 16 can direct the one or more light sources to emit a bright flash, pulse, or timed period of light as image recording device 16 takes a still image. For example, smart phones often have very limited flash capability, and may direct the identified lighting units 10 to emit a very bright flash of light when the user captures an image using the smart phone. As another example, the command or request communicated to the identified lighting units 10 from image recording device 16 can direct the one or more light sources to emit light of a first color or brightness for a first period of time and then switch or transition into light of a second color or brightness, such as when recording a video.

At optional step 442, the user interacts with the image recording device 16 or image recording system 200 via user interface 37 regarding the request to illuminate the target with one or more of a plurality of lighting effects when the image recording device captures an image or records a video. For example, the user may push a button, such as a shutter button or record button, that causes the image recording device 16 or image recording system 200 to send the command or request to the identified one or more ambient lighting units to emit the lighting effect.

At step 450, the image recording device 16 captures the image or video as the lighting effects are performed. To coordinate the lighting units 10 and the image capture or recording, one or both of image recording device 16 and lighting units 10 may include a clock or other mechanism that facilitates timing.

According to another embodiment is a system 200 including an image recording device 16 and a lighting unit 10. Image recording device 16 can be a camera, video camera, or any other device configured or capable of capturing an image, including by still photography and videography, among others. Generally, image recording device 16 can be any of the embodiments described herein or otherwise envisioned, and can include any of the components of the devices described in conjunction with FIGS. 1 and 2 (e.g., one or more LED-based light sources 12, sensor 38, wireless communications module 36, etc.). Image recording device 16 can include a wireless communications module 36 that can be any communications device or protocol including but not limited to Wi-Fi, Bluetooth, IR, or a near field communication (NFC) chip. Image recording device 16 can include a sensor 38, such as a photodiode, that is collects ambient light data in the vicinity of image recording device 16 and can transmit data internally, or externally via wireless communications module 36, that is representative of the ambient light data it collects.

System 200 also includes one or more lighting units 10. Lighting unit 10 can be any of the embodiments described herein or otherwise envisioned, and can include any of the components of the lighting units described in conjunction with FIGS. 1 and 2 (e.g., one or more LED-based light sources 12, light source driver 24, controller 22, sensor 32, wireless communications module 34, etc.). The wireless communications module 34 can be, for example, Wi-Fi, Bluetooth, IR, or near field communication that is positioned in communication with controller 22 or, alternatively, controller 22 can be integrated with the wireless communications module.

System 200 also includes one or more targets 20. Target 20 can be, for example, any object, person, scene, or other thing or environment capable of being recorded. As just one example, target 20 may be a person or group of people. Target 20 may be a still target, or can move around the environment.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

It should also be understood that, unless clearly indicated to the contrary, in any methods claimed herein that include more than one step or act, the order of the steps or acts of the method is not necessarily limited to the order in which the steps or acts of the method are recited. Also, reference numerals appearing in the claims between parentheses, if any, are provided merely for convenience and should not be construed as limiting in any way.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A method for illuminating a target, the method comprising: selecting, using an image recording device comprising a wireless communications interface, one or more lighting units located within a first distance to the image recording device, wherein each lighting unit comprises an LED-based light source capable of emitting light with one or more of a plurality of lighting effects, wherein the selecting comprises the image recording device broadcasting a signal received by said one or more lighting units located within the first distance, receiving one or more responses from the one or more lighting units, and locating the one or more lighting units in relation to the target by determining whether said one or more lighting units is disposed within a location range to the image recording device; and communicating, via the wireless communication interface, to one or more of the selected lighting units a request to illuminate the target with one or more of said plurality of lighting effects when the image recording device captures an image or records a video, wherein the selecting comprises excluding at least one other lighting unit including a corresponding light source from being selected in response to determining that said at least one other lighting unit is disposed outside of said location range to the image recording device.

2. The method of claim 1, wherein each lighting unit further comprises a respective wireless communications interface.

3. The method of claim 2, wherein the one or more lighting units are connected via the respective wireless communications interface to a network, and further wherein said communicating comprises communication via said network.

4. The method of claim 1, wherein the image recording device further comprises a sensor configured to determine a parameter of ambient light.

5. The method of claim 1, wherein the image recording device further comprises a user interface configured to obtain data from a user regarding one or more of the plurality of lighting effects.

6. The method of claim 5, further comprising the step of obtaining, via said user interface, data from the user regarding the request to illuminate the target with one or more of said plurality of lighting effects when the image recording device captures an image or records a video.

7. The method of claim 1, wherein said location range to the image recording device is said first distance to the image recording device.

8. An image recording device recording device configured to capture an image or record a video of a target, the image recording device comprising: a wireless communications interface; a processor; and a non-transitory computer readable storage medium including a set of instructions that are executable by said processor, the set of instructions being operable at least to: select, using said wireless communications interface, one or more lighting units located within a first distance from said image recording device, wherein each of one or more lighting units comprises a respective LED-based light source capable of emitting light with one or more of a plurality of lighting effects, wherein the selecting comprises the image recording device broadcasting a signal received by the one or more lighting units located within the first distance, receiving one or more responses from the one or more lighting units, and locating the one or more lightings units in relation to the target by determining whether said one or more lighting units is disposed within a location range to the image recording device; and direct said wireless communications interface to communicate to one or more of the selected lighting units a request to illuminate the target with one or more of said plurality of lighting effects when the image recording device captures an image or records a video, wherein the selecting comprises excluding at least one other lighting unit including a corresponding light source from being selected in response to determining that said at least one other lighting unit is disposed outside of said location range to the image recording device.

9. The image recording device of claim 8, wherein each of the one or more lighting units further comprises a respective wireless communications interface.

10. The image recording device of claim 8, wherein the image recording device further comprises a sensor configured to determine a parameter of ambient light.

11. The image recording device of claim 10, wherein the request to illuminate the target with one or more of said plurality of lighting effects is based at least in part on the determined parameter.

12. The image recording device of claim 8, wherein the request to illuminate the target with one or more of said plurality of lighting effects is based at least in part on data obtained from a user.

13. The image recording device of claim 8, wherein said location range to the image recording device is said first distance to the image recording device.

14. A lighting system configured to illuminate a target, the lighting system comprising: a lighting unit, the lighting unit comprising an LED-based light source capable of emitting light with one or more of a plurality of lighting effects, a communication interface, and a controller operably connected between the communications interface and the LED-based light source, wherein the lighting unit is connected via a first wireless communications interface to a network; and an image recording device comprising a second wireless communications interface, wherein the image recording device is programmed to wirelessly transmit to the first wireless communications interface a request to illuminate the target with one or more of said plurality of lighting effects when the image recording device records an image; wherein said controller is configured to direct said LED-based light source to emit said one or more lighting effects in response to said request, and wherein the image recording device is configured to select at least the lighting unit from a plurality of networked lighting units including respective light sources, the selecting comprising the image recording device broadcasting a signal received by one or more of the lighting units located within a first distance, receiving one or more responses from one or more of the lighting units located within the first distance, and locating the one or more of the lighting units in relation to the target by determining whether said one or more of the lighting units is disposed within a location range to the image recording device, wherein the selecting comprises excluding at least one other lighting unit including a corresponding light source from being selected in response to determining that said at least one other lighting unit is disposed outside of said location range to the image recording device.

15. The lighting system of claim 14, wherein the request to illuminate the target is transmitted, at least part, via said network and is based at least in part on a determined parameter.

16. The lighting system of claim 14, wherein the image recording device further comprises a sensor configured to determine a parameter of ambient light.

17. The lighting system of claim 14, wherein said location range to the image recording device is said first distance to the image recording device.

* * * * *